(12) United States Patent
Mastrolia et al.

(10) Patent No.: US 10,053,221 B2
(45) Date of Patent: Aug. 21, 2018

(54) MULTI-STAGED SUSPENSION LINE LENGTH PARACHUTES

(71) Applicant: GOODRICH CORPORATION, Charlotte, NC (US)

(72) Inventors: Bradley Mastrolia, Colorado Springs, CO (US); Kassidy L. Carson, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 296 days.

(21) Appl. No.: 15/153,473

(22) Filed: May 12, 2016

(65) Prior Publication Data
US 2017/0327236 A1 Nov. 16, 2017

(51) Int. Cl.
*B64D 17/52* (2006.01)
*B64D 17/38* (2006.01)
*B64D 17/34* (2006.01)
*B64D 17/58* (2006.01)

(52) U.S. Cl.
CPC ......... *B64D 17/386* (2013.01); *B64D 17/343* (2013.01); *B64D 17/346* (2013.01); *B64D 17/58* (2013.01)

(58) Field of Classification Search
CPC ........ B64D 17/08; B64D 17/10; B64D 17/22; B64D 17/24; B64D 17/36; B64D 17/343; B64D 17/346
See application file for complete search history.

(56) References Cited

U.S. PATENT DOCUMENTS

| 2,520,931 | A | * | 9/1950 | Heinrich | B64D 17/36 244/152 |
| 2,736,524 | A | * | 2/1956 | Thebault | B64D 17/343 244/152 |
| 2,843,933 | A | * | 7/1958 | Richards | B64D 17/386 30/182 |
| 3,348,793 | A | | 10/1967 | Kriesel et al. | |
| 3,887,151 | A | | 6/1975 | Matsuo | |
| 3,940,095 | A | * | 2/1976 | Asciutto | B64D 17/40 244/148 |
| 4,022,406 | A | * | 5/1977 | Matsuo | B64D 17/34 244/152 |

(Continued)

FOREIGN PATENT DOCUMENTS

WO 02076828 10/2002

OTHER PUBLICATIONS

Search Report dated Oct. 23, 2017 in U.K. Application No. GB1707569.8.

*Primary Examiner* — Richard G Davis
(74) *Attorney, Agent, or Firm* — Snell & Wilmer, L.L.P.

(57) ABSTRACT

A multi-staged suspension line length parachute is provided. The parachute may comprise a canopy, a suspension line, a bundle, a bundling confluence, a traditional confluence, and a riser. The parachute may also comprise a cutter and a cutter pin puller configured to activate the cutter. The bundle may comprise a bundling line configured to secure secondary length from the suspension line. The parachute may deploy to a first length. In response to tension on the cutter pin puller, the cutter may activate to sever the bundling line in the bundle, causing the secondary length of the suspension line to release. The parachute may then deploy to a second length.

17 Claims, 10 Drawing Sheets

(56) References Cited

U.S. PATENT DOCUMENTS

| | | | |
|---|---|---|---|
| 4,513,931 A * | 4/1985 | Kenzie | B64D 17/386 244/152 |
| 4,693,436 A | 9/1987 | Gold et al. | |
| 5,232,184 A * | 8/1993 | Reuter | B64D 17/64 244/147 |
| 5,472,155 A | 12/1995 | Mastrolia | |
| 5,648,623 A | 7/1997 | Silverstein et al. | |
| 5,893,536 A * | 4/1999 | Lee | B64D 17/36 244/149 |
| 6,301,753 B1 | 10/2001 | Karg et al. | |
| 7,195,205 B1 | 3/2007 | Lee | |

\* cited by examiner

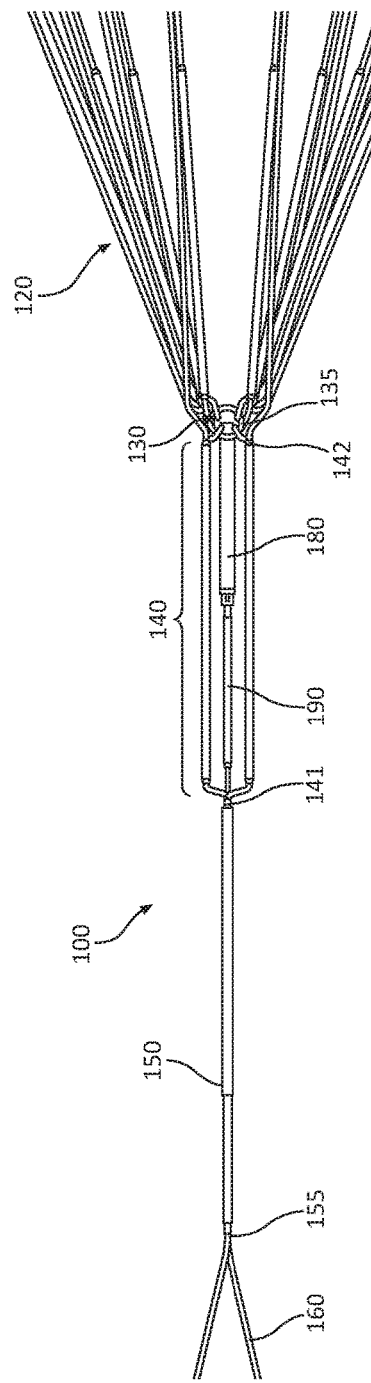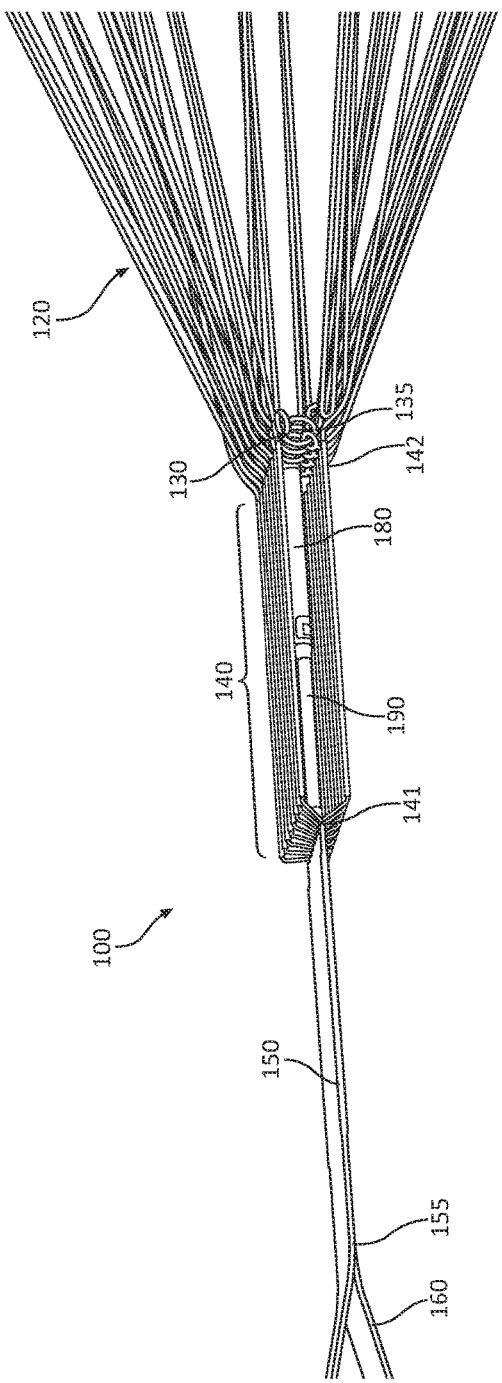

MULTI-STAGED SUSPENSION LINE LENGTH PARACHUTES

FIELD

The present disclosure relates to parachutes, and more specifically, to multi-staged suspension line length parachutes.

BACKGROUND

Traditional parachutes may comprise a canopy, risers, and suspension line. The canopy may increase drag, the suspension line may connect the canopy to the risers, and the risers may attach the parachute to the object and/or person being dropped. Typical parachutes comprise a constant length suspension line and a canopy that is configured to deploy to a larger diameter to increase drag. A time delay triggered in the ejection sequence is used to delay deployment of the larger diameter canopy until sufficient clearance has been achieved from the aircraft structure so that collision does not occur between the deploying canopy and/or suspension line and the aircraft structure.

SUMMARY

In various embodiments, a multi-staged suspension line length parachute is disclosed. The multi-staged suspension line length parachute may comprise a suspension line comprising a primary length and a secondary length. The multi-staged suspension line length parachute may comprise a bundle coupled to the suspension line. The bundle may comprise a bundling line configured to secure the secondary length. The multi-staged suspension line length parachute may comprise a cutter coupled to the bundling line. The cutter may be configured to sever the bundling line to release the secondary length.

In various embodiments, the multi-staged suspension line length parachute may also comprise a canopy coupled to the suspension line. The multi-staged suspension line length parachute may further comprise a riser, a bundling confluence coupled to the bundle, wherein the bundling confluence comprises the cutter, and a traditional confluence coupled to the bundling confluence at a first end and the riser at a second end. The secondary length may be tacked onto at least one of the canopy or the primary length. In various embodiments, the multi-staged suspension line length parachute may further comprise a sleeve coupled to the suspension line. The sleeve may be configured to stow the secondary length. In various embodiments, the multi-staged suspension line length parachute may also comprise an anti-squid control line having a first end coupled to at least one of the bundle or the bundling confluence, and a second end coupled to the canopy. In various embodiments, the multi-staged suspension line length parachute may further comprise a cutter pin puller coupled to the cutter and configured to activate the cutter to sever the bundling line.

In various embodiments, a method is disclosed. The method may comprise deploying a multi-staged suspension line length parachute to a first length. The multi-staged suspension line length parachute may comprise a suspension line having a primary length and a secondary length. The method may comprise activating a cutter to sever a bundling line in a bundle coupled to the suspension line to release the secondary length. The method may comprise deploying the multi-staged suspension line length parachute to a second length.

In various embodiments, the method may further comprise coupling the cutter to a bundling confluence. The bundling confluence may be coupled to the bundle. In various embodiments, the method may also comprise coupling, via a traditional confluence, the riser to the bundling confluence. In various embodiments, the method may also comprise tacking the secondary length to at least one of the canopy or the primary length. The canopy may be coupled to the suspension line. In various embodiments, the method may also comprise stowing the secondary length in a sleeve coupled to the primary length of the suspension line. In various embodiments, the method may also comprise stabilizing, by an anti-squid control line having a first end coupled to at least one of the bundle or the bundling confluence, and a second end coupled to the canopy. In various embodiments, the method may also comprise delaying the activating the cutter in response to the cutter having a time delay.

In various embodiments, a parachute arrangement is disclosed. The parachute arrangement may comprise a plurality of suspension lines attachable to a canopy. The parachute arrangement may comprise a first portion of the plurality of suspension lines having a primary length being deployable upon a first deployment of the parachute arrangement. The parachute arrangement may comprise a second portion of the plurality of suspension lines having a secondary length being prevented from deployment until the first portion have fully deployed and a load provided through the plurality of suspensions lines has exceeded a selected threshold value.

In various embodiments, the parachute arrangement may further comprise a bundle coupled to the plurality of suspension lines. The bundle may comprise a bundling line configured to secure the secondary length. A cutter may be coupled to the bundling line and configured to sever the bundling line to release the secondary length. In various embodiments, the parachute arrangement may further comprise a cutter pin puller coupled to the cutter and configured to activate the cutter in response to the load provided through the plurality of suspension lines exceeding the selected threshold value. In various embodiments, the parachute arrangement may further comprise an anti-squid control line having a first end coupled to the bundle, and a second end coupled to the canopy. In various embodiments, the secondary length may be tacked onto at least one of the canopy or the primary length. In various embodiments, the parachute arrangement may further comprise a sleeve coupled to the plurality of suspension lines, wherein the sleeve may be configured to stow the secondary length.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 2A illustrates a side view of a bundling confluence, in accordance with various embodiments;

FIG. 2B illustrates a side perspective view of a bundling confluence, in accordance with various embodiments;

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
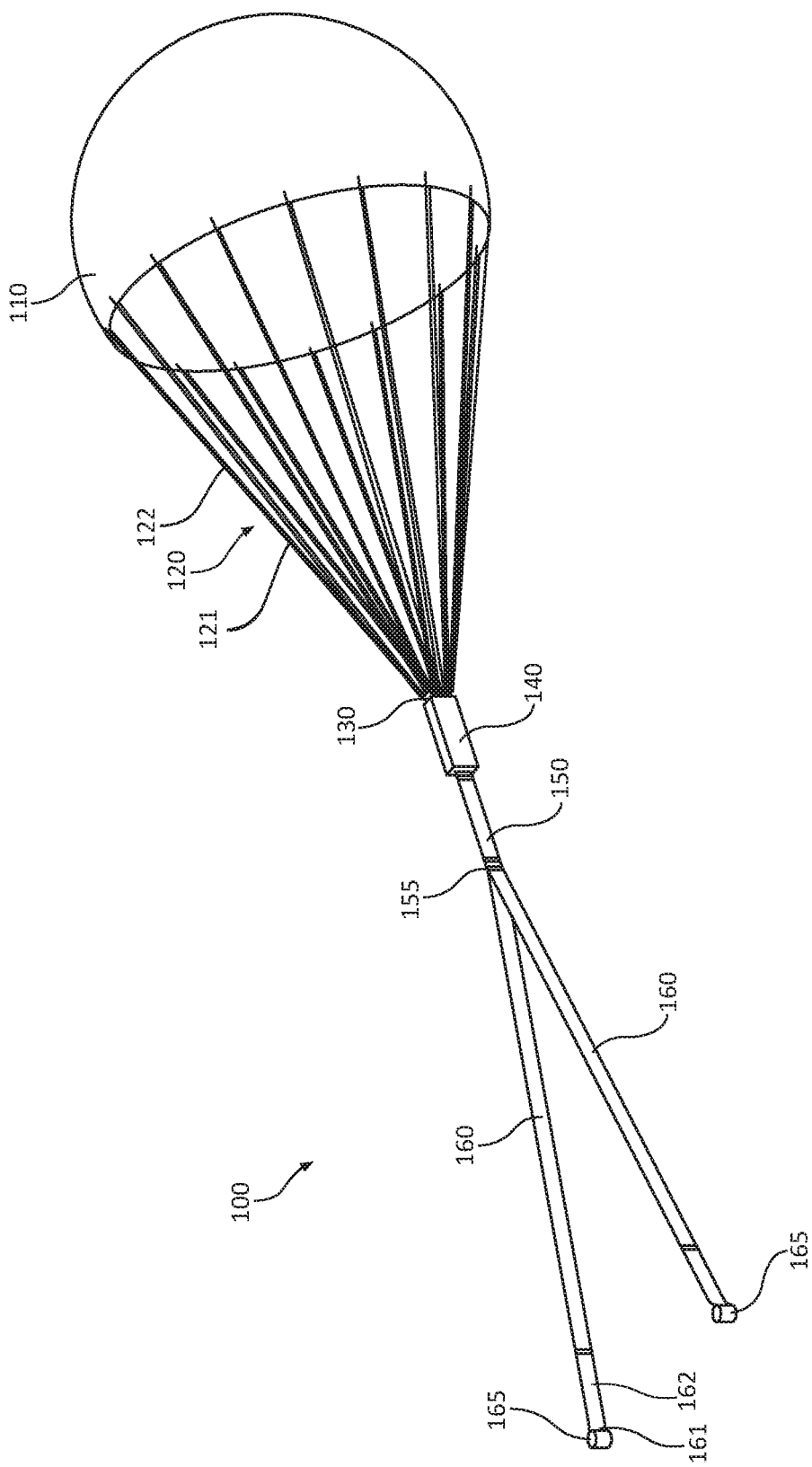
FIG. 1 illustrates a perspective view of a multi-staged suspension line length parachute deployed to a first length, in accordance with various embodiments.

In various embodiments, and with reference to FIG. 1, a multi-staged suspension line length parachute 100 is disclosed. Multi-staged suspension line length parachute 100 may be used to increase an object's, article's, person's, and/or the like (collectively, "object") drag in response to the object being dropped, jumped, ditched, and/or ejected (collectively, "dropped") from an aircraft, or otherwise decelerated. Multi-staged suspension line length parachute 100 may be configured to enable a multi-stage length parachute wherein after deployment of the suspension lines to a first length, the suspension lines may release to a second, longer overall length. A multi-staged length may allow multi-staged suspension line length parachute 100 to deploy at the first length to provide clearance over aircraft obstacles (such as an aircraft tail) when exiting an aircraft, before deploying to the second length for added parachute stability. In that regard, multi-staged suspension line length parachute 100 may comprise a first deployment and a second deployment. Deploying at the first length may also reduce opening shock in multi-staged suspension line length parachute 100 while simultaneously achieving an earlier suspension line stretch. Multi-staged suspension line length parachute 100 may comprise a canopy 110, a suspension line 120, a bundle 130, a bundling confluence 140, a traditional confluence 150, and a risers 160.

In various embodiments, canopy 110 may be configured to increase drag in multi-staged suspension line length parachute 100. Upon deployment of multi-staged suspension line length parachute 100, canopy 110 may deploy to increase drag, or otherwise decelerate, the object. Canopy 110 may comprise any suitable type of canopy and any suitable type of material, such as, for example, canvas, silk, nylon, aramid fiber (e.g., Kevlar®), polyethylene terephthalate, and/or the like.

In various embodiments, suspension line 120 may be configured to connect canopy 110 to risers 160, through traditional confluence 150 and bundling confluence 140. With brief reference to FIG. 5, suspension line 120 may comprise a primary length 121 and a secondary length 122. Primary length 121 may comprise the length of suspension line 120 from bundle 130 to where suspension line 120 couples to canopy 110. In this regard, primary length 121 may comprise the portion of suspension line 120 that is deployed during the first deployment of multi-staged suspension line length parachute 100. Secondary length 122 may comprise excess cable from suspension line 120 that is deployed during the second deployment of multi-staged suspension line length parachute 100. Suspension line 120 may comprise a plurality of suspension lines that are configured to at least partially stabilize the deployed canopy 110. Suspension lines 120 may couple to canopy 110 using any suitable technique, such as, for example, through stitching, and/or through any other suitable method. In various embodiments, suspension lines 120 and/or risers 160 may comprise any suitable material. For example, suspension lines 120 and/or risers 160 may comprise a tubular braided material that constricts in diameter under tension, such as, for example, nylon, aramid fiber (e.g., Kevlar®), and/or the like.

In various embodiments, traditional confluence 150 may be configured to connect suspension line 120 from bundling confluence 140 to risers 160. In various embodiments, multi-staged suspension line length parachute 100 may comprise a greater number of suspension lines 120 compared to risers 160. In various embodiments, multi-staged suspension line length parachute 100 may comprise any suitable number of risers 160, such as, for example, 1 to 8 risers 160, or 4 to 8 risers 160. In various embodiments, the number of risers 160 may be 2. In various embodiments, each risers 160 may couple to any suitable number of suspension lines 120, such as, for example 1 to 16 suspension lines 120, or 8 to 16 suspension lines 120. In various embodiments, each risers 160 may couple to 8 suspension lines 120. In various embodiments, the total number of suspension lines 120 may be a product of the number of risers 160 and the number of suspension lines 120 per risers 160. For example, multi-staged suspension line length parachute 100 comprising 2 risers 160 and 8 suspension lines 120 per risers 160 would comprise a total of 16 suspension lines 120.

In various embodiments, traditional confluence 150 may comprise an area of multi-staged suspension line length parachute 100 where suspension lines 120 are bound together. Suspension lines 120 may pass through bundling confluence 140 (as described below), and be bound together in traditional confluence 150 via weaving, stitching, and/or through any other suitable method. Traditional confluence 150 may comprise a stitching area 155 that separates suspension lines 120 into risers 160. For example, where the number of suspension lines 120 is 16, and the number of risers 160 is 2, stitching area 155 may separate suspension lines 120 into two sets of 8 suspension lines 120. Each risers 160 may couple to an individual set of suspension lines 120.

In various embodiments, a single traditional confluence 150 may be preferable to having each risers 160 connected to several suspension lines 120, as it may reduce the probability of entanglement of suspension lines 120 before, during, and/or after the first deployment of multi-staged suspension line length parachute 100. Traditional confluence 150 may also allow canopy 110 to maintain a consistent shape in response to the attached object rotating or unloading from one of risers 160.

In various embodiments, risers 160 may be configured to attach an object to multi-staged suspension line length parachute 100. In various embodiments, multi-staged suspension line length parachute 100 may comprise a plurality of risers 160 to attach the object at a number of distinct points in order to simplify the connecting gear and minimize its weight. The use of a plurality of risers 160 may also stabilize the object during deceleration or drop by reducing the rotation of the object about an axis perpendicular to its velocity vector.

In various embodiments, risers 160 may comprise an attachment location 165 on an end opposite of traditional confluence 150. Attachment location 165 may comprise any suitable attachment mechanism for securing the object to multi-staged suspension line length parachute 100. For example, attachment location 165 may comprise a loop created by risers 160 being bound to itself. Attachment location 165 of risers 160 may be secured by insertion. In that regard, risers 160 may comprise a slit located near attachment location 165. The slit may provide communication with a cavity 161 in risers 160, such that an end of risers 160 may be inserted within cavity 161 to create the loop. The section of risers 160 inserted within cavity 161 may be initially attached by tacking, however, in response to tension being applied to risers 160 (via the weight of the object carried by multi-staged suspension line length parachute 100, for example), a section 162 of risers 160 comprising cavity 161 may radially constrict, and the friction of cavity 161 walls may hold the enclosed portion of risers 160 in cavity 161 and prevent it from being pulled out cavity 161.

Figure 2C:
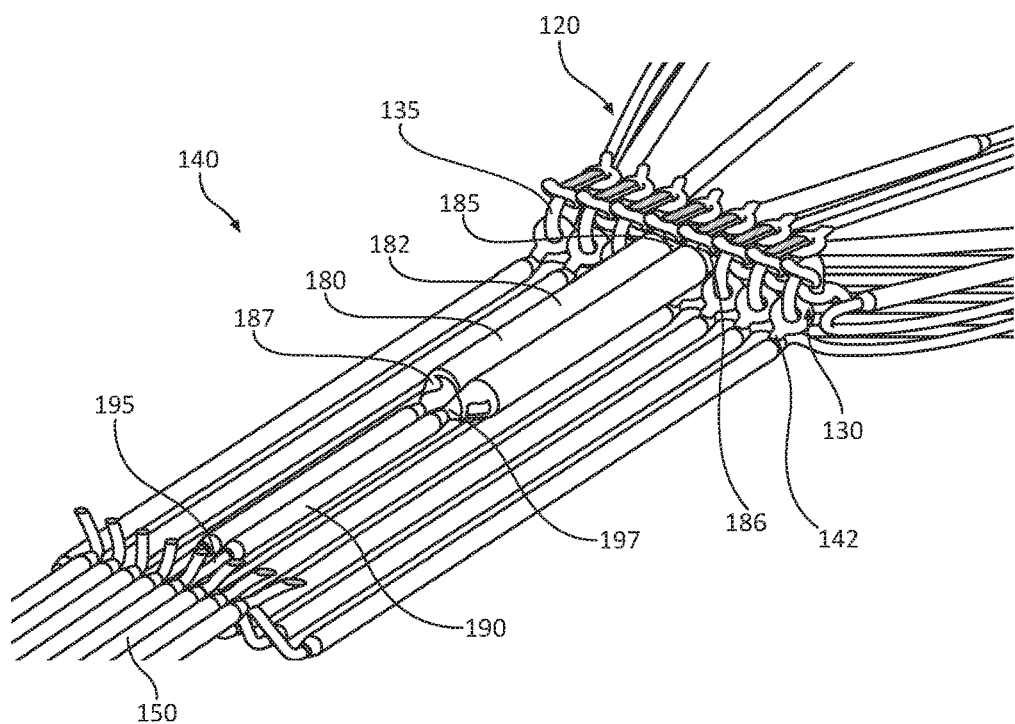
FIG. 2C illustrates a perspective view of a cutter in a bundling confluence, in accordance with various embodiments.
Figure 2D:
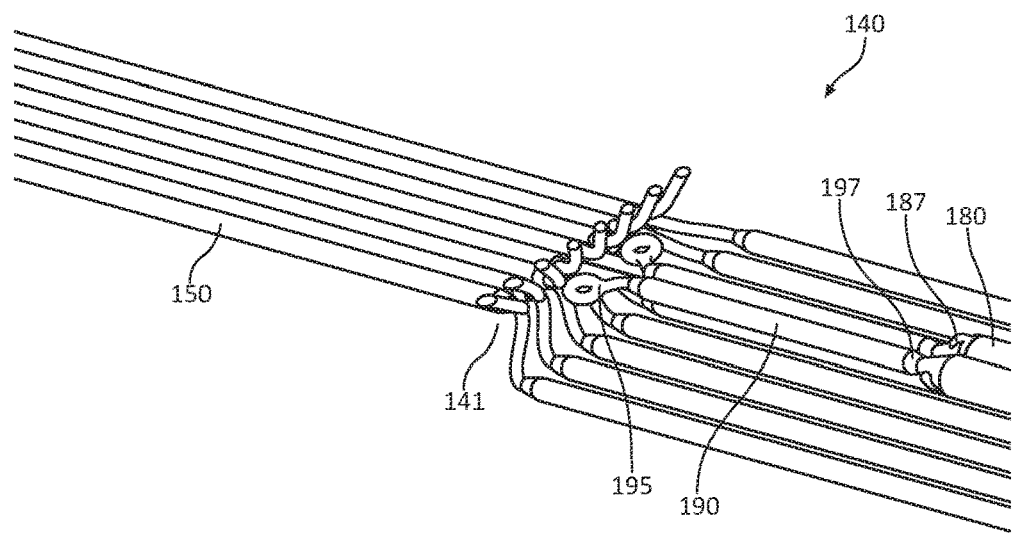
FIG. 2D illustrates a perspective view of a cutter in a bundling confluence, in accordance with various embodiments.

In various embodiments, and with reference to FIGS. 2A-2D, bundling confluence 140 is depicted in greater detail. Bundling confluence 140 may comprise a confluence end 141 and a suspension end 142. Confluence end 141 may be configured to connect bundling confluence 140 to traditional confluence 150. In various embodiments, confluence end 141 may also be configured to connect to risers 160. Suspension end 142 may be configured to connect bundling confluence 140 to bundle 130. Bundling confluence 140 may comprise a cutter 180 and a cutter pin puller 190. In various embodiments, bundling confluence 140 may comprise any suitable number of cutter 180 and matching cutter pin puller 190. For example, as depicted in FIGS. 2C and 2D, bundling confluence 140 may comprise two cutters 180 and two corresponding cutter pin pullers 190 (e.g., for redundancy purposes).

Figure 2E:
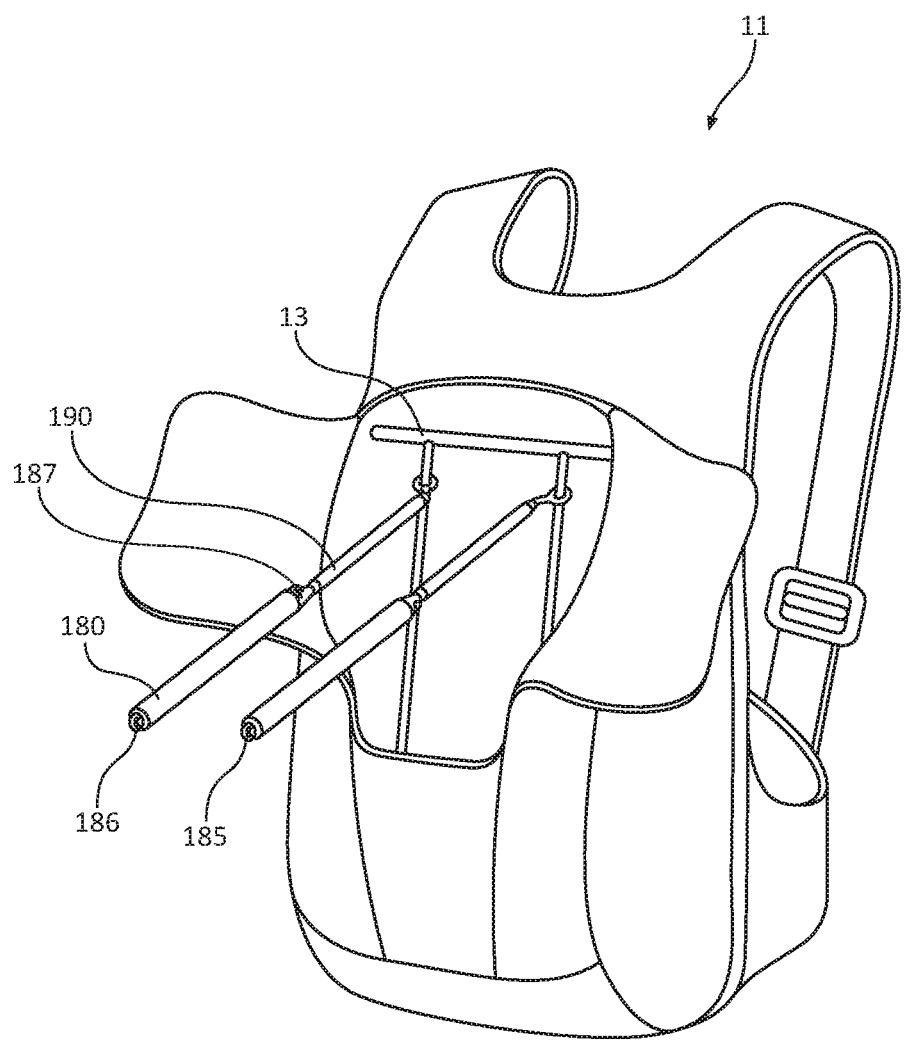
FIG. 2E illustrates a perspective view of a cutter activating from a storage container, in accordance with various embodiments.

In various embodiments, cutter 180 may be configured to sever bundle 130 to release secondary length 122 from suspension line 120 during the second deployment of multi-staged suspension line length parachute 100. Cutter 180 may comprise a pin end 187 and a head end 185 concealed within a cutter sleeve 182. Cutter sleeve 182 may comprise the same material as suspension lines 120 and risers 160, and/or any other suitable material, and may be configured to enclose cutter 180. Pin end 187 may be connected to a first end 197 of cutter pin puller 190. Pin end 187 may comprise a sear mechanism that is activated in response to pin end 187 being pulled. The sear mechanism may comprise a trigger mechanism, and/or the like, configured to release a hammer, striker, bolt, blade, shape charge, and/or the like, in response to pin end 187 being activated. Once activated, the sear mechanism may release, via an explosive charge, a mechanical spring, and/or the like, the bolt, hammer, striker, bolt, blade, shape charge, and/or the like towards head end 185 of cutter 180. Head end 185 may be connected to a bundling line 135 of bundle 130. In that regard, and with brief reference to FIG. 2E, bundling line 135 may pass through an aperture 186 of head end 185. The bolt, hammer, striker, bolt, blade, shape charge, and/or the like released from the sear mechanism may pass through aperture 186 to sever bundling line 135.

Cutter pin puller 190 may be configured to activate pin end 187 from cutter 180 during and/or after the first deployment of multi-staged suspension line length parachute 100. For example, cutter pin puller 190 may connect to bundling confluence 140 at a second end 195. Cutter pin puller 190 may pull pin end 187 in response to tension imparted by bundling confluence 140 during deployment, such as, for example, a tension of about 15 lbs. (6.8 kg) to about 40 lbs. (18.1 kg), or about 25 lbs. (11.3 kg) to about 40 lbs. (18.1) (wherein about in this context refers only to +/−5 lbs. (2.3 kg)). In various embodiments, cutter pin puller 190 may couple to suspension line 120 at second end 195, such that cutter pin puller 190 may be configured to pull pin end 187 in response to tension imparted by suspension line 120. In various embodiments, and with brief reference to FIG. 2E, cutter pin puller 190 may also be configured to connect to a storage container 11 (e.g. a storage device, backpack, and/or the like) for multi-staged suspension line length parachute 100. For example, cutter pin puller 190 may be connected to a flute 13 within the storage container. After the first deployment of multi-staged suspension line length parachute 100, and after bundling confluence 140 clears storage container 11, tension may be imparted on cutter pin puller 190 as cutter pin puller 190 is pulled away from flute 13, activating pin end 187.

Once activated, pin end 187 may initiate a time delay before activating the sear mechanism. The time delay may be configured to delay activation of the sear mechanism, and may allow multi-staged suspension line length parachute 100 to avoid obstacles (e.g., an aircraft tail) after deployment while also reducing opening shock to multi-staged suspension line length parachute 100. The time delay may comprise any suitable time delay based on properties of multi-staged suspension line length parachute 100, the type of aircraft, and/or the load limitations of the object being carried by multi-staged suspension line length parachute 100. In that regard, the time delay may be about 0.10 seconds to about 2 seconds, or about 1 second to about 2 seconds (wherein about in this context only refers to +/−0.025 seconds). In various embodiments, the time delay may be about 0.25 seconds. In various embodiments, after the time delay has passed, pin end 187 may activate the sear mechanism in cutter 180.

Figure 3A:
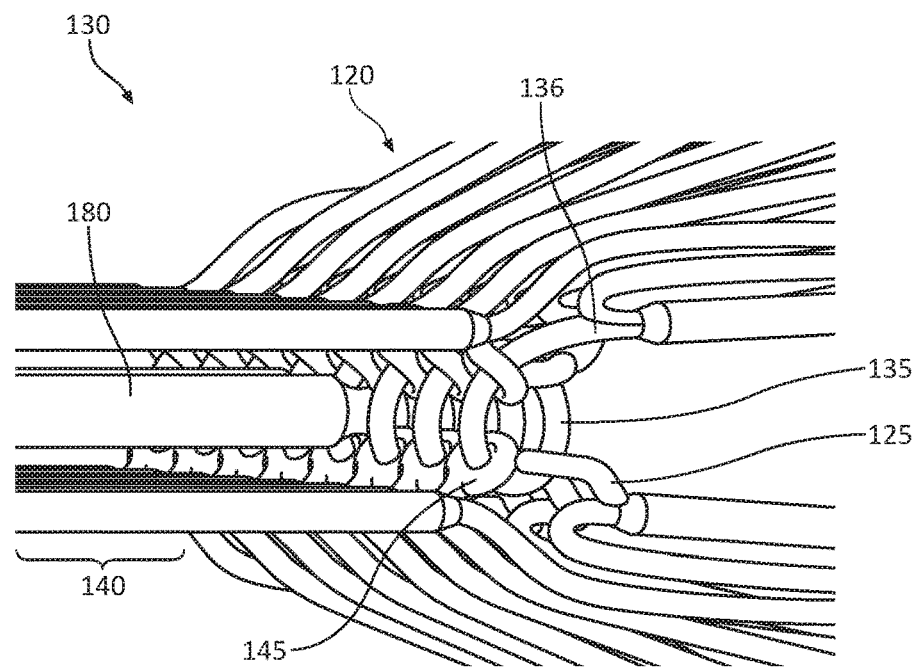
FIG. 3A illustrates a side perspective view of a bundle, in accordance with various embodiments.
Figure 3B:
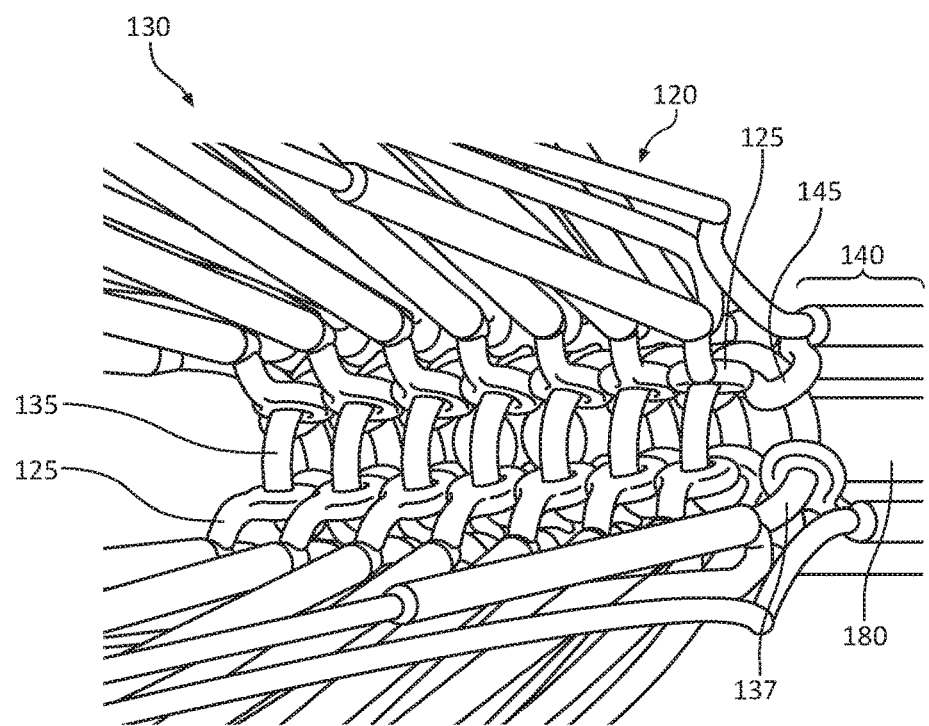
FIG. 3B illustrates a perspective view of a bundle, in accordance with various embodiments.

In various embodiments, and with reference to FIGS. 3A and 3B, bundle 130 is depicted in greater detail. Bundle 130 may be configured as a central point for securing and deploying secondary length 122 from suspension line 120. Bundle 130 may comprise bundling line 135, configured to secure primary length 121 and secondary length 122 of suspension line 120 prior to the second deployment of multi-staged suspension line length parachute 100. Bundling line 135 may comprise a first insertion end 136 opposite of a second insertion end 137. First insertion end 136 and second insertion end 137 may be configured to couple to suspension line 120, and/or bundling confluence 140, to restrain suspension line 120 to a temporary shorter length. First insertion end 136 and second insertion end 137 may couple at any suitable point on suspension line 120, and/or bundling confluence 140, such that suspension line 120 may comprise only the shortened primary length in response to deployment. First insertion end 136 and second insertion end 137 may couple to suspension line 120, and/or bundling confluence 140, using any suitable technique, such as, for example through insertion (as described above).

In various embodiments, multi-staged suspension line length parachute 100 may comprise a confluence bundling loop 145 and a suspension bundling loop 125 configured to couple to bundling line 135. In various embodiments, multi-staged suspension line length parachute 100 may comprise a plurality of confluence bundling loops 145 configured to couple bundling confluence 140 to bundling line 135. Confluence bundling loops 145 may couple to bundling confluence 140 using any suitable technique, such as through insertion (as described above). In various embodiments, multi-staged suspension line length parachute 100 may also comprise a plurality of suspension bundling loops 125 configured to couple secondary length 122 of suspension lines 120 to bundling line 135. Suspension bundling loops 125 may couple to suspension lines 120 using any suitable technique, such as through insertion (as described above).

Figure 5:
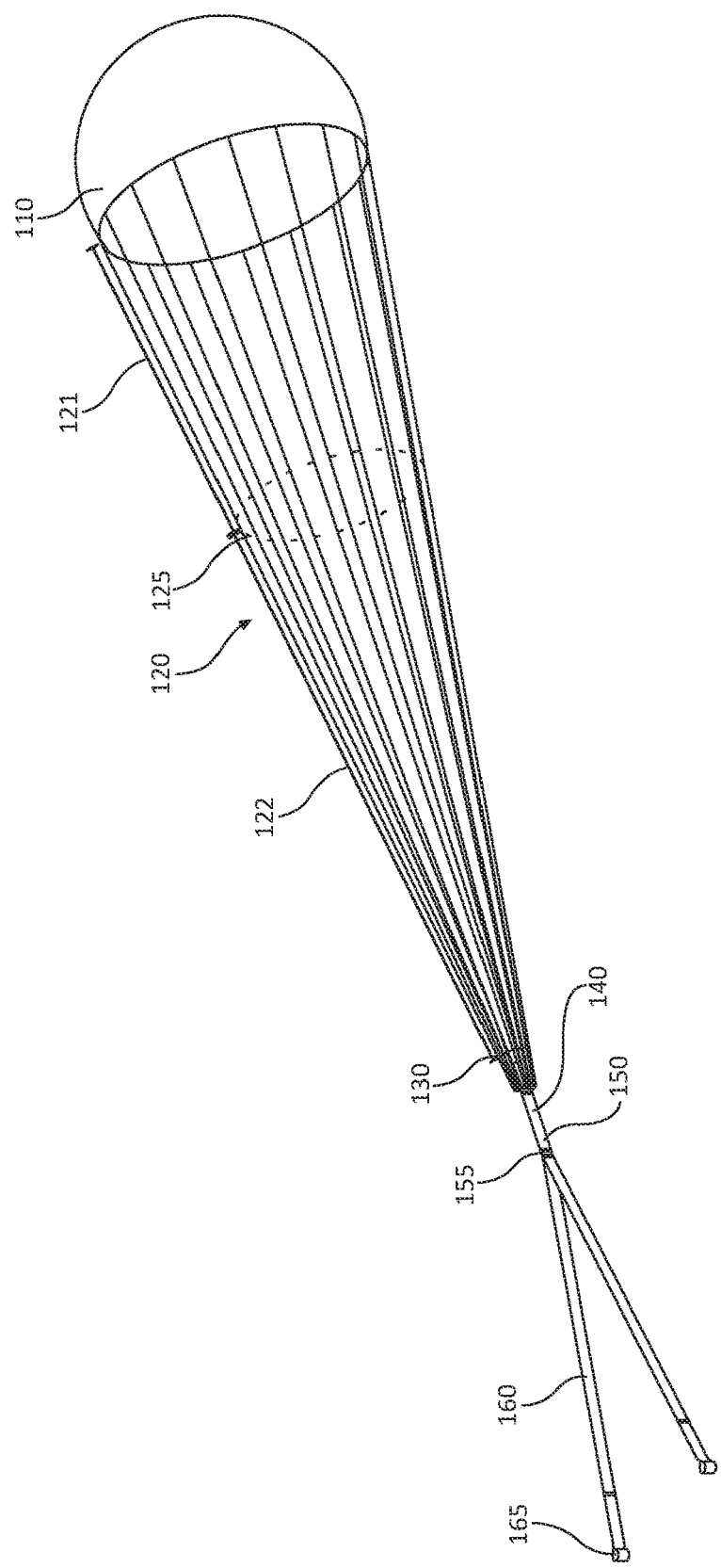
FIG. 5 illustrates a deployed multi-staged suspension line length parachute deployed to a second length, in accordance with various embodiments.

In various embodiments, bundling line 135 may be configured to pass through confluence bundling loops 145 and suspension bundling loops 125 to secure suspension line 120 to bundle 130. In various embodiments, bundling line 135 may comprise any suitable shape, size, and/or design suitable to route from first insertion end 136 through confluence bundling loops 145 and suspension bundling loops 125 and into second insertion end 137. For example, bundling line 135 may comprise a helical pattern, a zig-zag pattern, and/or any other suitable pattern. In response to bundling line 135 being severed by cutter 180, suspension bundling loops 125 may release to allow suspension line 120 to stretch to the second length (as depicted in FIG. 5).

Figure 4A:
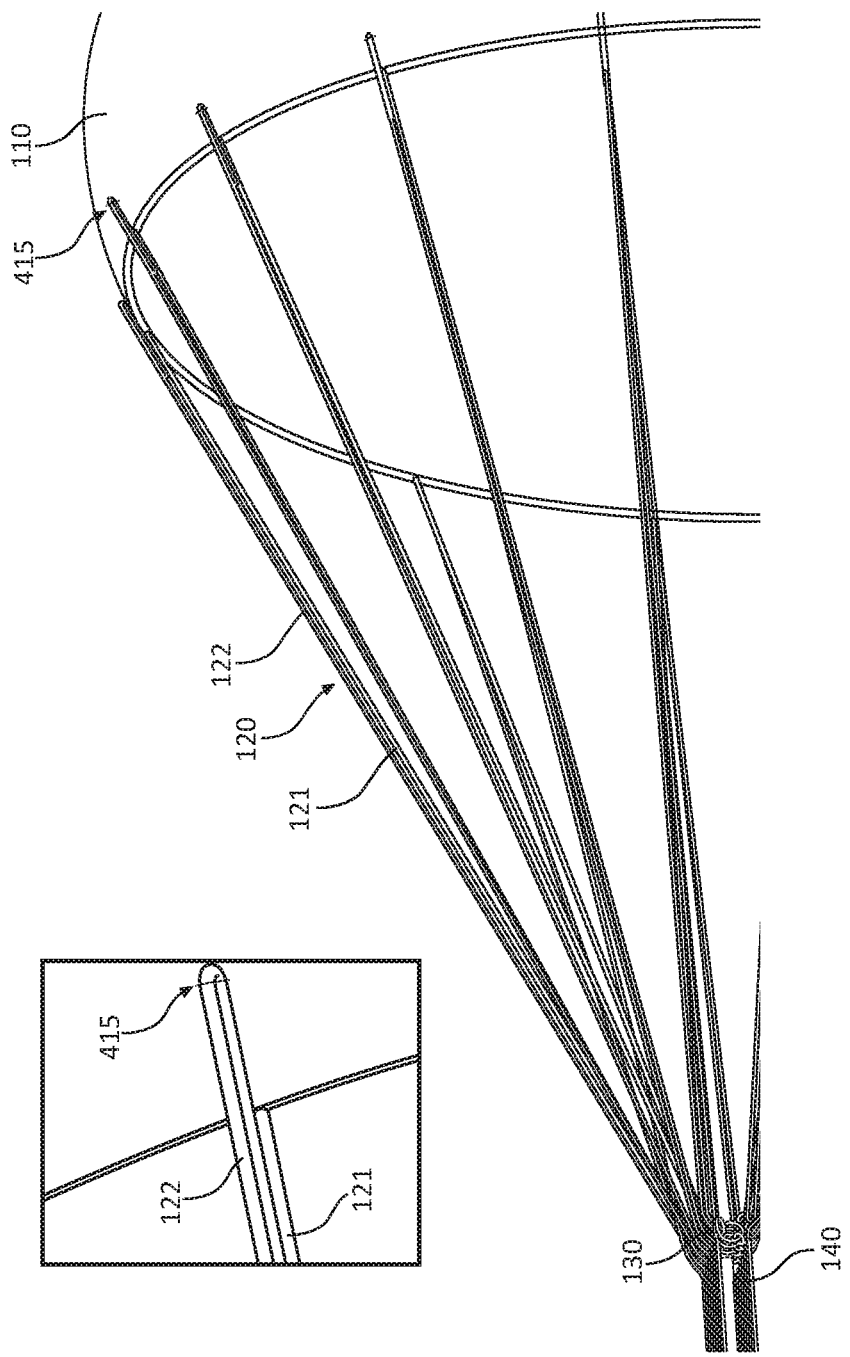
FIG. 4A illustrates a multi-staged suspension line length parachute having a secondary length of suspension line stowed parallel to the primary length and tacked to the canopy, in accordance with various embodiments.

In various embodiments, secondary length 122 from suspension line 120 may also be stowed to prevent tangling of suspension line 120 prior to the first deployment (and/or the second deployment) of multi-staged suspension line length parachute 100. In various embodiments, and with reference to FIG. 4A, secondary length 122 from suspension line 120 may be attached to canopy 110 at a second location 415, and/or along primary length 121. In that regard, secondary length 122 may be attached to second location 415, and/or primary length 121, using any suitable technique allowing secondary length 122 to de-attach and deploy during the second deployment of multi-staged suspension line length parachute 100. For example, secondary length 122 may be attached by tacking secondary length 122 to canopy 110. In this regard, secondary length 122 from suspension line 120 may be stowed parallel to primary length 121 of suspension line 120, and tacked to canopy 110 at second location 415, and/or along primary length 121.

In various embodiments, secondary length 122 may be configured to de-attach from second location 415, and/or primary length 121, in response to the tacking breaking under tension. In that regard, bundling line 135 may prevent tension from being imparted to secondary length 122, thereby preventing breakage of the tacking until the secondary deployment of the parachute. For example, and with brief reference to FIGS. 2A-2D, in response to cutter 180 activating to sever bundling line 135, secondary length 122 may release and apply tension to the tacking, through secondary length 122. The tacking may break under the tension to release secondary length 122 from second location 415, and/or primary length 121. The tacking may be configured to break under any suitable and/or desired amount of tension, dependent upon the type of multi-staged suspension line length parachute 100, weight and size of the object being carried, type of aircraft, and/or any other operational and/or conditional elements. Secondary length 122 may be tacked to second location 415, and/or along primary length 121, using any suitable material, knots, and/or cords dependent upon the amount of tension desired to break under.

Figure 4B:
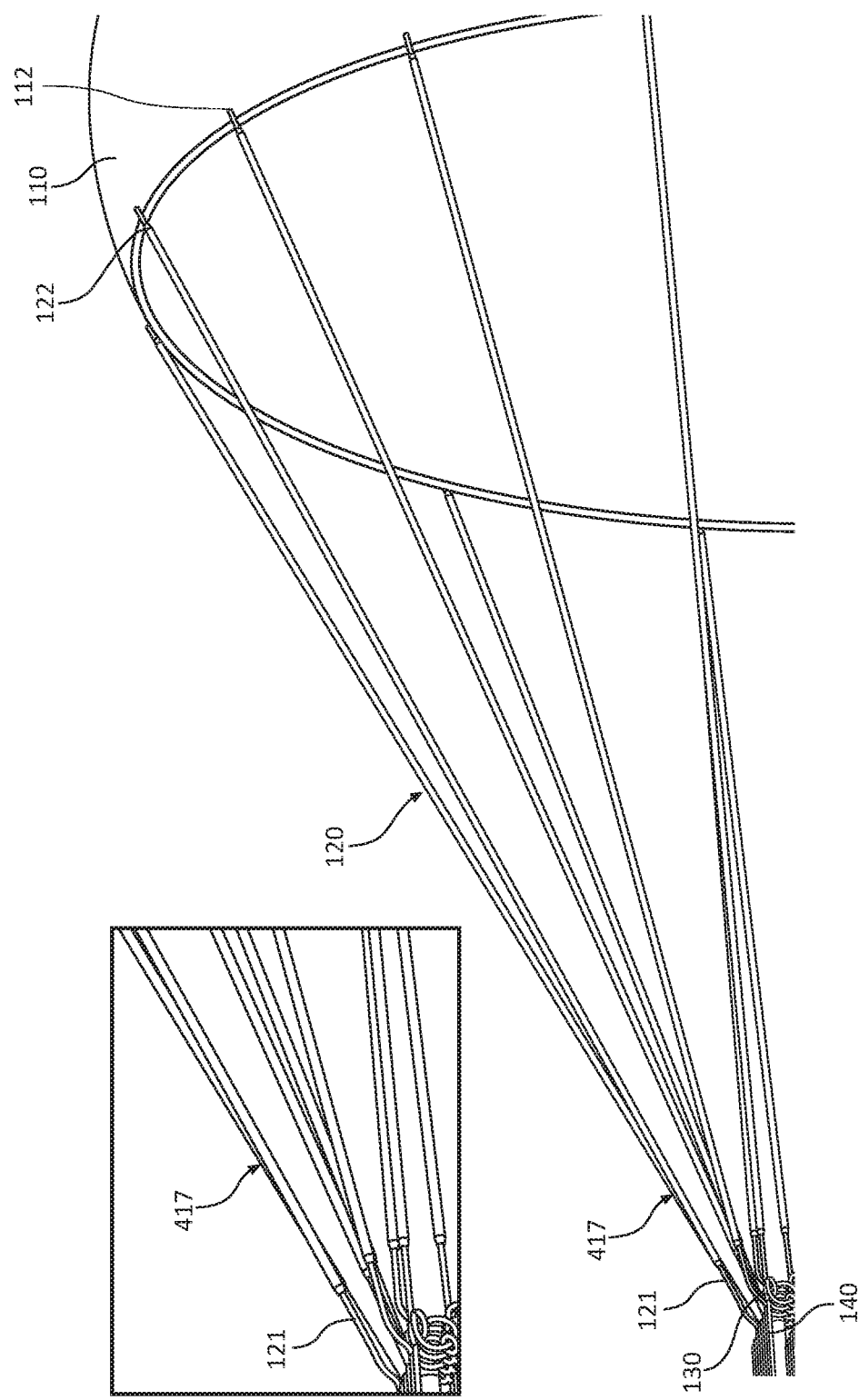
FIG. 4B illustrates a multi-staged suspension line length parachute having a secondary length of suspension line stowed in a sleeve parallel to the primary length, in accordance with various embodiments.

In various embodiments, and with reference to FIG. 4B, secondary length 122 from suspension line 120 may be stowed in a sleeve 417. In that regard, secondary length 122 from suspension line 120 may be inserted into sleeve 417 to prevent entanglement of secondary length 122 from suspension line 120 prior to, and during, the first deployment (and/or second deployment) of multi-staged suspension line length parachute 100. In various embodiments, sleeve 417 may comprise a full-length continuous sleeve spanning from bundle 130 to canopy 110. In further embodiments, sleeve 417 may comprise any other suitable length capable of storing secondary length 122 from suspension line 120. Sleeve 417 may comprise a low friction material such that sleeve 417 may stow secondary length 122 from suspension line 120 before deployment and during the first deployment, but also allow secondary length 122 from suspension line 120 to release after the second deployment. Sleeve 417 may be coupled to suspension line 120, such as through stitching and/or the like. In various embodiments, secondary length 122 from suspension line 120 may also be stowed in a bundle, pouch, loop, or via any other suitable and/or desirable stowage method.

In various embodiments, and with reference to FIG. 5, multi-staged suspension line length parachute 100 in a second deployment (after activation of cutter 180) is depicted. In response to cutter 180 activating to sever bundling line 135, suspension bundling loops 125 may release from bundling line 135 to allow secondary length 122 from suspension line 120 to deploy. In this regard, suspension line 120 is able to deploy to the full length of primary length 121 and secondary length 122 to extend into a second length longer than the first length (i.e., the first length comprises only primary length 121 of suspension line 120, whereas the second length comprise primary length 121 and secondary length 122 of suspension line 120).

Figure 6:
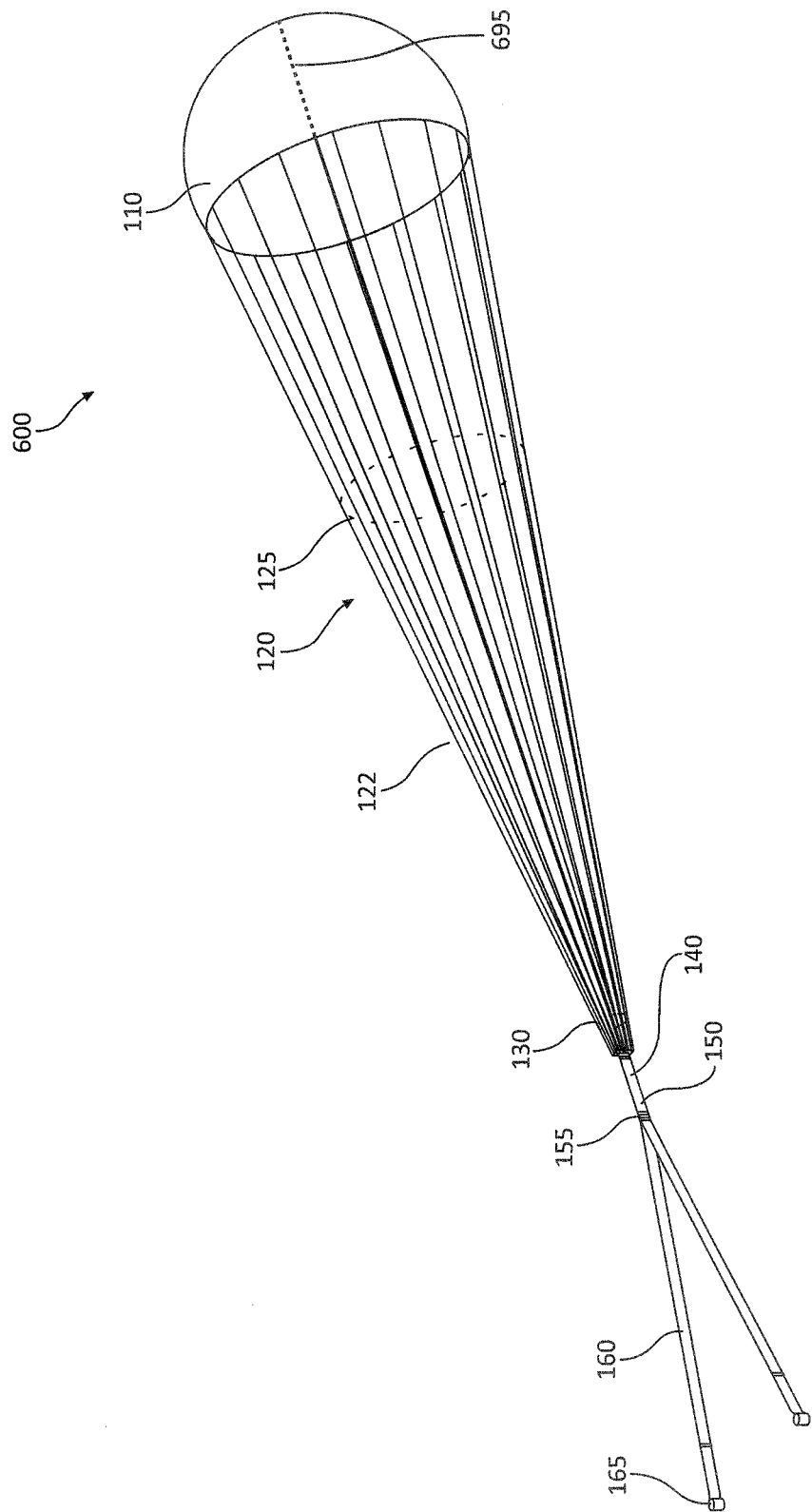
FIG. 6 illustrates a multi-staged suspension line length parachute having an anti-squid control line, in accordance with various embodiments.

In various embodiments, and with reference to FIG. 6, multi-staged suspension line length parachute 100 may also comprise an anti-squid control line 695. Anti-squid control line 695 may be configured to prevent "squidding" (e.g., an elongation and/or partial inflation of canopy 110) when multi-staged suspension line length parachute 100 is in the first deployment, where wake effects may be more pronounced. Anti-squid control line 695 may therefore enable greater control and stability to multi-staged suspension line length parachute 100. Anti-squid control line 695 may comprise similar properties to suspension line 120, including having both a primary length and an excess control length, enabling greater efficiency and stability to deployed canopy 110. Anti-squid control line 695 may be coupled at one end to bundle 130, and/or bundling confluence 140. In this regard, anti-squid control line 695 may be coupled to bundling line 135 (with brief reference to FIGS. 3A and 3B), such that anti-squid control line 695 may release to a second longer length during the second deployment at a consistent time with suspension line 120. Anti-squid control line 695 may be coupled at a second end to an apex of canopy 110.

Figure 7:
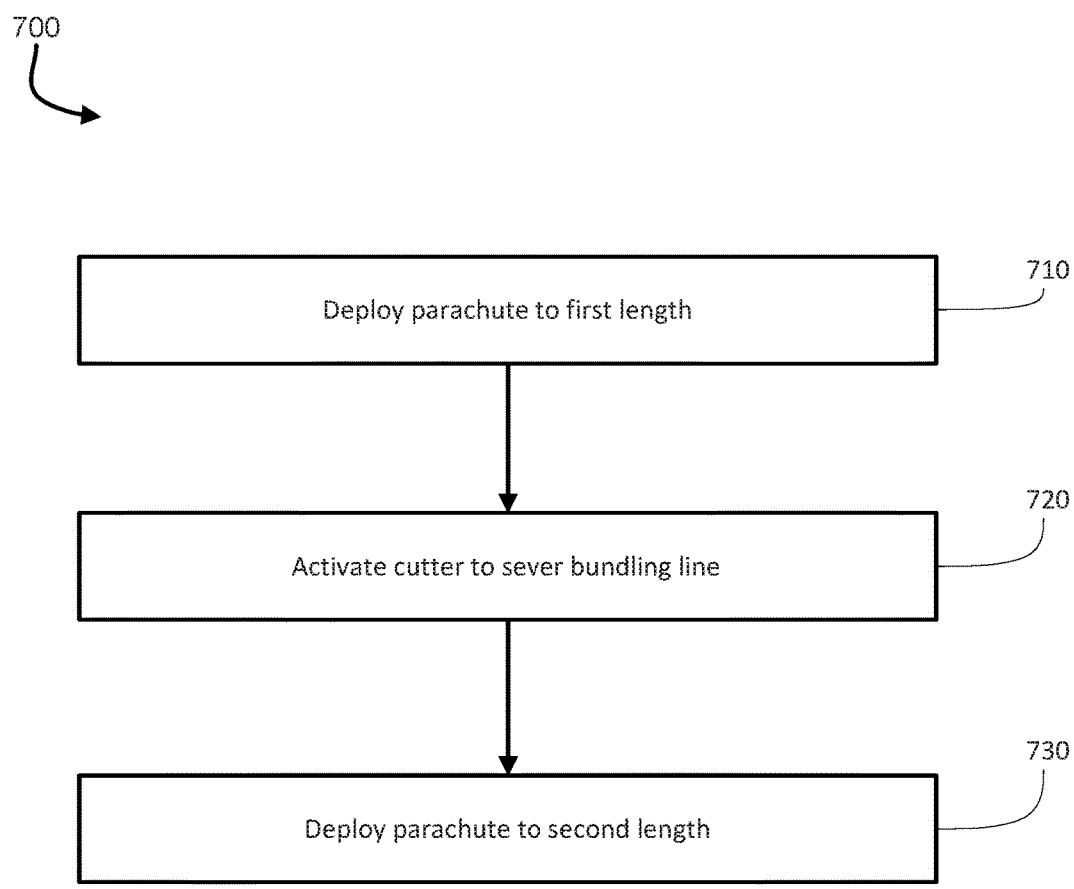
FIG. 7 illustrates a method for deploying a multi-staged suspension line length parachute, in accordance with various embodiments.

In various embodiments, and with reference to FIG. 7, a method 700 for deploying a multi-staged suspension line length parachute is disclosed. Method 700 may comprise deploying multi-staged suspension line length parachute 100 to a first length (Step 710). Step 710 may comprise deploying multi-staged suspension line length parachute 100 from a parachute container, and/or the like. For example, step 710 may comprise deploying multi-staged suspension line length parachute 100 that is attached to an object. Upon deployment of multi-staged suspension line length parachute 100, canopy 110 may expand to create drag, imparting tension on suspension lines 120, bundle 130, bundling confluence 140, traditional confluence 150, and risers 160. The imparted tension may stretch suspension lines 120 to the first length. With brief reference to FIG. 6, tension may also be imparted to anti-squid control line 695 to stretch anti-squid control line 695 to a first length.

In various embodiments, method 700 may comprise activating cutter 180 to sever bundling line 135 (Step 720). In response to the tension from the first deployment of multi-staged suspension line length parachute 100 during Step 710, cutter pin puller 190 may activate cutter 180 by pulling pin end 187. Step 710 may comprise cutter 180 severing bundling line 135, via head end 185, to release secondary length 122 from suspension line 120. In various embodiments, method 700 may comprise deploying multi-staged suspension line length parachute 100 to a second length (Step 730). The second length may be longer than the first length. In various embodiments, cutter 180 may comprise a time delay configured to delay step 730 after activating cutter 180. In response to cutter 180 activating to sever bundling line 135, secondary length 122 from suspension line 120 may release to allow multi-staged suspension line length parachute 100 to deploy into the second length. With brief reference to FIG. 4A, tension from suspension line 120 may break the tacking at second location 415, and/or along primary length 121, to further release suspension line 120 into the second length. With brief reference to FIG. 4B, tension from suspension line 120 may enable secondary length 122 from suspension line 120 to release from sleeve 417.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-staged suspension line length parachute, comprising:
   a suspension line comprising a primary length and a secondary length;
   a bundle coupled to the suspension line, wherein the bundle comprises a bundling line configured to secure the secondary length;
   a cutter coupled to the bundling line, wherein the cutter is configured to sever the bundling line to release the secondary length;
   a bundling confluence coupled to the bundle, wherein the bundling confluence comprises the cutter; and
   a traditional confluence coupled to the bundling confluence opposite the bundle.

2. The multi-staged suspension line length parachute of claim 1, further comprising a canopy coupled to the suspension line.

3. The multi-staged suspension line length parachute of claim 1, further comprising
   a riser coupled to the traditional confluence opposite the bundling confluence.

4. The multi-staged suspension line length parachute of claim 2, wherein the secondary length is tacked onto at least one of the canopy or the primary length.

5. The multi-staged suspension line length parachute of claim 1, further comprising a sleeve coupled to the suspension line, wherein the sleeve is configured to stow the secondary length.

6. The multi-staged suspension line length parachute of claim 2, further comprising an anti-squid control line having a first end coupled to at least one of the bundle or the bundling confluence, and a second end coupled to the canopy.

7. The multi-staged suspension line length parachute of claim 1, further comprising a cutter pin puller coupled to the cutter and configured to activate the cutter to sever the bundling line.

8. A method, comprising:
   deploying a multi-staged suspension line length parachute to a first length, wherein the multi-staged suspension line length parachute comprises a suspension line having a primary length and a secondary length;
   activating a cutter to sever a bundling line in a bundle coupled to the suspension line to release the secondary length; and
   deploying the multi-staged suspension line length parachute to a second length,
   wherein the cutter is coupled to a bundling confluence, wherein the bundling confluence is coupled to the bundle, and wherein a traditional confluence couples a riser to the bundling confluence.

9. The method of claim 8, further comprising tacking the secondary length to at least one of a canopy or the primary length, wherein the canopy is coupled to the suspension line.

10. The method of claim 8, further comprising stowing the secondary length in a sleeve coupled to the primary length of the suspension line.

11. The method of claim 8, further comprising stabilizing, by an anti-squid control line having a first end coupled to at least one of the bundle or the bundling confluence, and a second end coupled to a canopy.

12. The method of claim 8, further comprising delaying the activating the cutter in response to the cutter having a time delay.

13. A parachute arrangement, comprising:
   a plurality of suspension lines attachable to a canopy;
   a first portion of each of the plurality of suspension lines having a primary length being deployable upon a first deployment of the parachute arrangement;
   a second portion of each of the plurality of suspension lines having a secondary length being prevented from deployment until the first portion have fully deployed and a tension load provided through the plurality of suspensions lines has exceeded a defined tension load;
   a bundle coupled to the plurality of suspension lines, wherein the bundle comprises a bundling line configured to secure the secondary length;
   a bundling confluence coupled to the bundle and comprises a cutter, wherein the cutter is coupled to the bundling line and configured to sever the bundling line to release the secondary length; and
   a traditional confluence coupled to the bundling confluence opposite the bundle.

14. The parachute arrangement of claim 13, further comprising a cutter pin puller coupled to the cutter and configured to activate the cutter in response to the load provided through the plurality of suspension lines exceeding the defined tension load.

15. The parachute arrangement of claim 13, further comprising an anti-squid control line having a first end coupled to the bundle, and a second end coupled to the canopy.

16. The parachute arrangement of claim 13, wherein the secondary length is tacked onto at least one of the canopy or the primary length.

17. The parachute arrangement of claim 13, further comprising a sleeve coupled to the plurality of suspension lines, wherein the sleeve is configured to stow the secondary length.

* * * * *